United States Patent
Eshet et al.

(10) Patent No.: US 10,976,412 B2
(45) Date of Patent: Apr. 13, 2021

(54) DEEP LEARNING FOR SUPER RESOLUTION IN A RADAR SYSTEM

(71) Applicant: GM Global Technology Operations LLC, Detroit, MI (US)

(72) Inventors: Yaron Eshet, Haifa (IL); Igal Bilik, Rehovot (IL); Oded Bialer, Petah Tivak (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 309 days.

(21) Appl. No.: 16/264,807

(22) Filed: Feb. 1, 2019

(65) Prior Publication Data
US 2020/0249314 A1 Aug. 6, 2020

(51) Int. Cl.
G01S 7/41 (2006.01)
G01S 13/931 (2020.01)

(52) U.S. Cl.
CPC ............ G01S 7/417 (2013.01); G01S 13/931 (2013.01)

(58) Field of Classification Search
CPC ...... G01S 7/414; G01S 13/931; G05B 13/027
See application file for complete search history.

(56) References Cited

U.S. PATENT DOCUMENTS

| | | | | |
|---|---|---|---|---|
| 5,602,964 A * | 2/1997 | Barrett | ................. | G05B 13/027 |
| | | | | 706/25 |
| 10,761,187 B2 * | 9/2020 | Santra | ..................... | G01S 13/18 |
| 2010/0231439 A1 * | 9/2010 | Bachmann | ............... | G01S 7/414 |
| | | | | 342/169 |
| 2013/0082858 A1 * | 4/2013 | Chambers | .............. | G06N 99/00 |
| | | | | 342/22 |
| 2016/0097853 A1 * | 4/2016 | Kamo | .................... | G01S 13/584 |
| | | | | 342/70 |
| 2016/0223651 A1 * | 8/2016 | Kamo | .................... | G01S 13/426 |
| 2017/0307726 A1 * | 10/2017 | Mazzaro | ................. | G01S 7/354 |
| 2018/0149730 A1 * | 5/2018 | Li | ............................ | G01S 7/023 |
| 2018/0211128 A1 * | 7/2018 | Hotson | .................. | G01S 13/931 |
| 2019/0187251 A1 * | 6/2019 | Ghosh | ...................... | G06N 3/08 |
| 2019/0227157 A1 * | 7/2019 | Culkin | .................... | G01S 7/292 |
| 2019/0324108 A1 * | 10/2019 | Wittenberg | ........... | G01S 13/878 |
| 2019/0391251 A1 * | 12/2019 | Bharadwaj, Jr. | ...... | G01S 13/583 |
| 2020/0225317 A1 * | 7/2020 | Chen | ...................... | G01S 7/417 |

* cited by examiner

*Primary Examiner* — Peter M Bythrow
(74) *Attorney, Agent, or Firm* — Cantor Colburn LLP

(57) ABSTRACT

A system and method to use deep learning for super resolution in a radar system include obtaining first-resolution time samples from reflections based on transmissions by a first-resolution radar system of multiple frequency-modulated signals. The first-resolution radar system includes multiple transmit elements and multiple receive elements. The method also includes reducing resolution of the first-resolution time samples to obtain second-resolution time samples, implementing a matched filter on the first-resolution time samples to obtain a first-resolution data cube and on the second-resolution time samples to obtain a second-resolution data cube, processing the second-resolution data cube with a neural network to obtain a third-resolution data cube, and training the neural network based on a first loss obtained by comparing the first-resolution data cube with the third-resolution data cube. The neural network is used with a second-resolution radar system to detect one or more objects.

20 Claims, 5 Drawing Sheets

__DEEP LEARNING FOR SUPER RESOLUTION IN A RADAR SYSTEM__

INTRODUCTION

The subject disclosure relates to deep learning for super resolution in a radar system.

Radio detection and ranging (radar) systems are increasing used to detect or track objects in various applications. For example, a radar system may be deployed in a vehicle (e.g., automobile, truck, construction equipment, farm equipment, automated factory equipment) to detect objects and to facilitate augmentation or automation of vehicle operation. The resolution with which an object may be detected by a given radar system is dependent on design choices for the radar system, but the design choices may be limited by considerations such as, for example, size, cost, and weight. Accordingly, it is desirable to provide deep learning for super resolution in a radar system.

SUMMARY

In one exemplary embodiment, a method of using deep learning for super resolution in a radar system includes obtaining first-resolution time samples from reflections based on transmissions by a first-resolution radar system of multiple frequency-modulated signals. The first-resolution radar system includes multiple transmit elements and multiple receive elements. The method also includes reducing resolution of the first-resolution time samples to obtain second-resolution time samples, implementing a matched filter on the first-resolution time samples to obtain a first-resolution data cube and on the second-resolution time samples to obtain a second-resolution data cube, processing the second-resolution data cube with a neural network to obtain a third-resolution data cube, and training the neural network based on a first loss obtained by comparing the first-resolution data cube with the third-resolution data cube. The neural network is used with a second-resolution radar system to detect one or more objects.

In addition to one or more of the features described herein, the method also includes disposing the second-resolution radar system in a vehicle.

In addition to one or more of the features described herein, the method also includes performing detection of the one or more objects using the first-resolution data cube and using the third-resolution data cube.

In addition to one or more of the features described herein, the training the neural network is based on a second loss obtained by comparing a result of the detection performed using the first-resolution data cube with a result of the detection performed using the third-resolution data cube.

In addition to one or more of the features described herein, the method also includes inverting the third-resolution data cube to obtain third-resolution time samples.

In addition to one or more of the features described herein, the training the neural network is based on a third loss obtained by comparing the first-resolution time samples with the third-resolution time samples.

In addition to one or more of the features described herein, the reducing the resolution includes using all the first-resolution time samples resulting from only a sub-set of the multiple frequency-modulated signals.

In addition to one or more of the features described herein, the reducing the resolution includes using only a sub-set of the first-resolution time samples resulting from all the multiple frequency-modulated signals.

In addition to one or more of the features described herein, the reducing the resolution includes using the first-resolution time samples resulting from only a sub-set of the multiple transmit elements and the multiple receive elements of the first-resolution radar system.

In addition to one or more of the features described herein, the reducing the resolution includes obtaining the second-resolution time samples at a same resolution as time samples provided by the second-resolution radar system.

In another exemplary embodiment, a system to use deep learning for super resolution in a radar system includes a first-resolution radar system to obtain first-resolution time samples from reflections based on transmissions of multiple frequency-modulated signals. The first-resolution radar system includes multiple transmit elements and multiple receive elements. The system also includes a processor to reduce resolution of the first-resolution time samples to obtain second-resolution time samples, to implement a matched filter on the first-resolution time samples to obtain a first-resolution data cube and on the second-resolution time samples to obtain a second-resolution data cube, to process the second-resolution data cube with a neural network to obtain a third-resolution data cube, and to train the neural network based on a first loss obtained by comparing the first-resolution data cube with the third-resolution data cube. A second-resolution radar system uses the neural network to detect one or more objects.

In addition to one or more of the features described herein, the second-resolution radar system is in a vehicle.

In addition to one or more of the features described herein, the processor is further configured to perform detection of the one or more objects using the first-resolution data cube and using the third-resolution data cube.

In addition to one or more of the features described herein, the processor is configured to train the neural network based on a second loss obtained by comparing a result of the detection performed using the first-resolution data cube with a result of the detection performed using the third-resolution data cube.

In addition to one or more of the features described herein, the processor is further configured to invert the third-resolution data cube to obtain third-resolution time samples.

In addition to one or more of the features described herein, the processor is configured to train the neural network based on a third loss obtained by comparing the first-resolution time samples with the third-resolution time samples.

In addition to one or more of the features described herein, the processor is configured to reduce the resolution of the first-resolution time samples by using all the first-resolution time samples resulting from only a sub-set of the multiple frequency-modulated signals.

In addition to one or more of the features described herein, the processor is configured to reduce the resolution of the first-resolution time samples by using only a sub-set of the first-resolution time samples resulting from all the multiple frequency-modulated signals.

In addition to one or more of the features described herein, the processor is configured to reduce the resolution of the first-resolution time samples by using the first-resolution time samples resulting from only a sub-set of the multiple transmit elements and the multiple receive elements of the first-resolution radar system.

In addition to one or more of the features described herein, the processor is configured to reduce the resolution to obtain the second-resolution time samples at a same resolution as time samples provided by the second-resolution radar system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
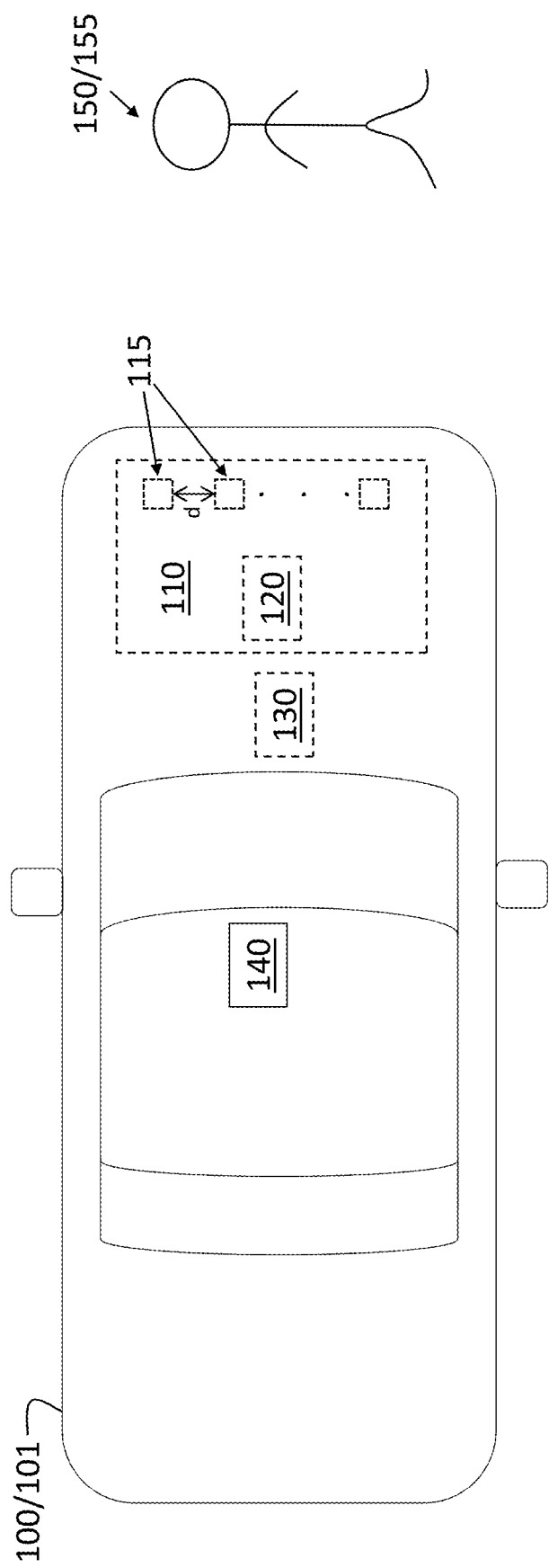
FIG. 1 is a block diagram of a vehicle that can perform deep learning for super-resolution in a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, radar systems may be used in a variety of applications. For example, radar systems may provide information that is used to augment or automate vehicle operation. A vehicle radar system may be a single input multiple output (SIMO) system with multiple transmit elements and a single receive element or a multiple input multiple output (MIMO) system with multiple transmit and receive elements, for example. In addition, a vehicle radar system may transmit a linear frequency modulated continuous wave (LFMCW) signal, also referred to as a chirp, for example. The design choices of a radar system affect different aspects of radar resolution. For example, the angular resolution (i.e., the resolution with which the azimuth angle to an object is detected) is affected by the number and spacing of antennas. The range resolution (i.e., the resolution with which the range to an object is detected) is affected by the bandwidth (i.e., chirp frequency span). The Doppler resolution (i.e., the resolution with which relative velocity of an object is detected) is affected by the duration of the frame that is processed by the receiver.

Embodiments of the systems and methods detailed herein relate to deep learning for super resolution in a radar system. Super resolution refers to the process of obtaining high resolution images or other outputs from low resolution images or other inputs. Deep learning is a type of machine learning that learns the hierarchical representation of data and may be either supervised or unsupervised. Supervised learning requires ground truth annotation efforts. According to exemplary embodiments, a self-supervised approach is used, where the annotations are inherited in the data itself. According to the embodiments, while data is obtained with a given resolution for a given radar system, that resolution may be increased through the deep learning. Thus, the embodiments include a learning aspect and an implementation aspect. Further, as detailed, the learning and the resolution increase may be implemented at different stages in the processing of data obtained by the radar system.

In accordance with an exemplary embodiment, FIG. 1 is a block diagram of a vehicle 100 that can perform deep learning for super-resolution in a radar system 110. The vehicle 100 shown in FIG. 1 is an automobile 101. The exemplary vehicle 100 includes the radar system 110 and may additionally include other sensors 140 (e.g., lidar, camera) to detect and track objects 150 such as the pedestrian 155 shown in FIG. 1. The vehicle 100 also includes one or more vehicle controllers 130 (e.g., electronic control unit (ECU)). The vehicle controllers 130 may control aspects of the operation of the vehicle 100 or may control automation of the vehicle 100 based on information from the radar system 110. The radar system 110 is shown with an array of antenna elements 115, which are separated by a distance d, and a radar controller 120.

The radar controller 120 may include an oscillator to generate chirps. Reflected signals received by the radar system 110 based on the reflection of transmitted chirps by objects 150 in the field of view of the radar system 110 may be processed by the radar controller 120, a vehicle controller 130, or a combination of the two. Both the radar controller 120 and the vehicle controller 130 may include processing circuitry and other components. The processing circuitry may include an application specific integrated circuit (ASIC), an electronic circuit, a processor (shared, dedicated, or group) and memory that executes one or more software or firmware programs, a combinational logic circuit, and/or other suitable components that provide the described functionality.

As previously noted, according to one or more embodiments, the vehicle 100 uses deep learning to obtain super-resolution from the radar system 110. Specifically, the radar controller 120, the vehicle controller 130, or a combination of the two may be used for the processes detailed herein. A higher resolution radar system than the radar system 110 that is actually deployed in the vehicle 100 is used to train a neural network according to a deep learning process. Once trained, the neural network can be used with the lower-resolution radar system 110 to provide higher resolution output than would otherwise be possible with the radar system 110 (i.e., super resolution). Thus, a single high resolution radar system may be used to train the neural network to be used with many lower-resolution radar systems 110 in corresponding vehicles. While higher and lower resolution are used to describe the systems in relative terms, the specific characteristics of the radar system 110 that affect resolution are detailed.

Resolution may pertain to angular resolution (i.e., the accuracy with which the azimuth angle or elevation angle to an object 150 may be ascertained), range resolution (i.e., the accuracy with which the range to an object 150 may be determined), or Doppler resolution (i.e., the accuracy with which the radial velocity of an object 150 may be determined). Angular resolution is affected by the number of antenna elements 115 (e.g., more antenna elements 115, while maintaining a half-wavelength spacing, provide higher angular resolution). Range resolution is affected by bandwidth, which is the span of frequencies of the transmitted chirp (e.g., higher bandwidth corresponds with higher range resolution). Doppler resolution is affected by the duration of the frame that is processed (e.g., longer frame results in higher Doppler resolution). Thus, there is a hardware or processing cost to obtaining higher resolution (in angle, range, or Doppler) with the radar system 110 alone. According to the embodiments detailed herein, a radar system 110 with characteristics that suggest a given level of angular resolution, range resolution, and Doppler resolution may nonetheless be used to obtain detections of objects 150 with a higher resolution (super resolution) based on training a neural network as detailed.

Figure 2:
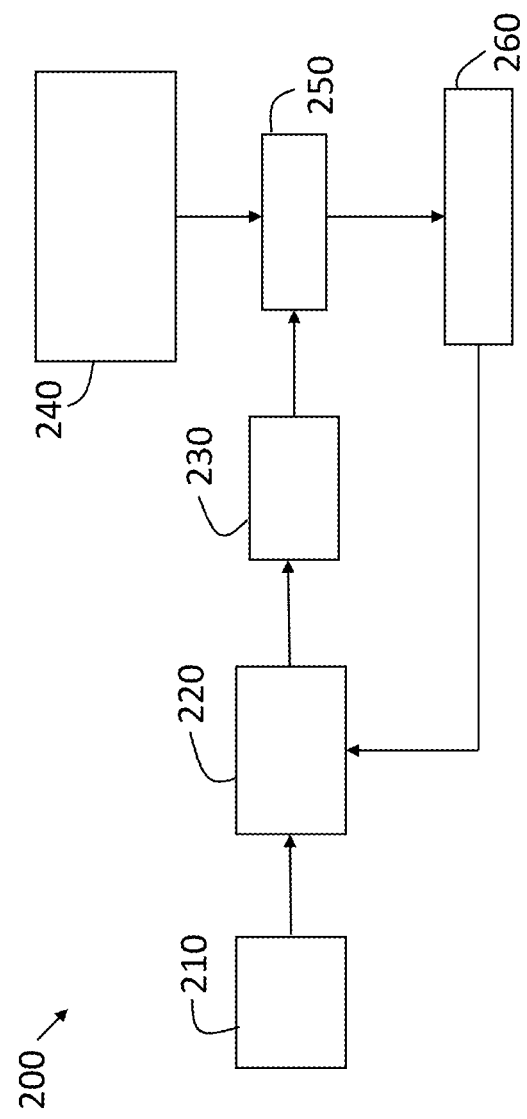
FIG. 2 is an exemplary general process flow of the training process for the neural network used to perform deep learning for super resolution in the radar system according to one or more embodiments.

FIG. 2 is an exemplary general process flow 200 of the training process for the neural network used to perform deep learning for super resolution in the radar system 110 according to one or more embodiments. At block 210, the processes of the process flow 200 include providing an input to a neural network. Based on processing of the input by the neural network, at block 220, an output is obtained at block 230. At block 240, obtaining ground truth for the output obtained at block 230 facilitates comparing the output of the neural network with the ground truth data, at block 250. The difference, according to the comparison at block 250, facilitates providing a loss, at block 260, to the neural network. This loss is back-propagated and used to update the neural network weights at block 220 during training.

In exemplary embodiments, which are detailed with reference to FIG. 3, the input provided, at block 210, is low-resolution data and the output, obtained at block 230 based on the neural network processing at block 220, is high-resolution data. This high-resolution output is compared, at block 250, with ground truth data obtained, at block 240, from a higher resolution radar system than the radar system 110. The higher resolution radar system is used in the training of the neural network while the radar system 110 is deployed with the neural network in order to obtain super resolution according to one or more embodiments. The loss provided, at block 260, according to the comparison of the high-resolution data obtained from the neural network and the ground truth data is used to improve the neural network processing. Specifically, weights within the neural network are modified based on the loss. As the discussion of FIG. 3 indicates, the loss used to train the neural network may be obtained at one or more of three different domains according to one or more embodiments.

Figure 3:
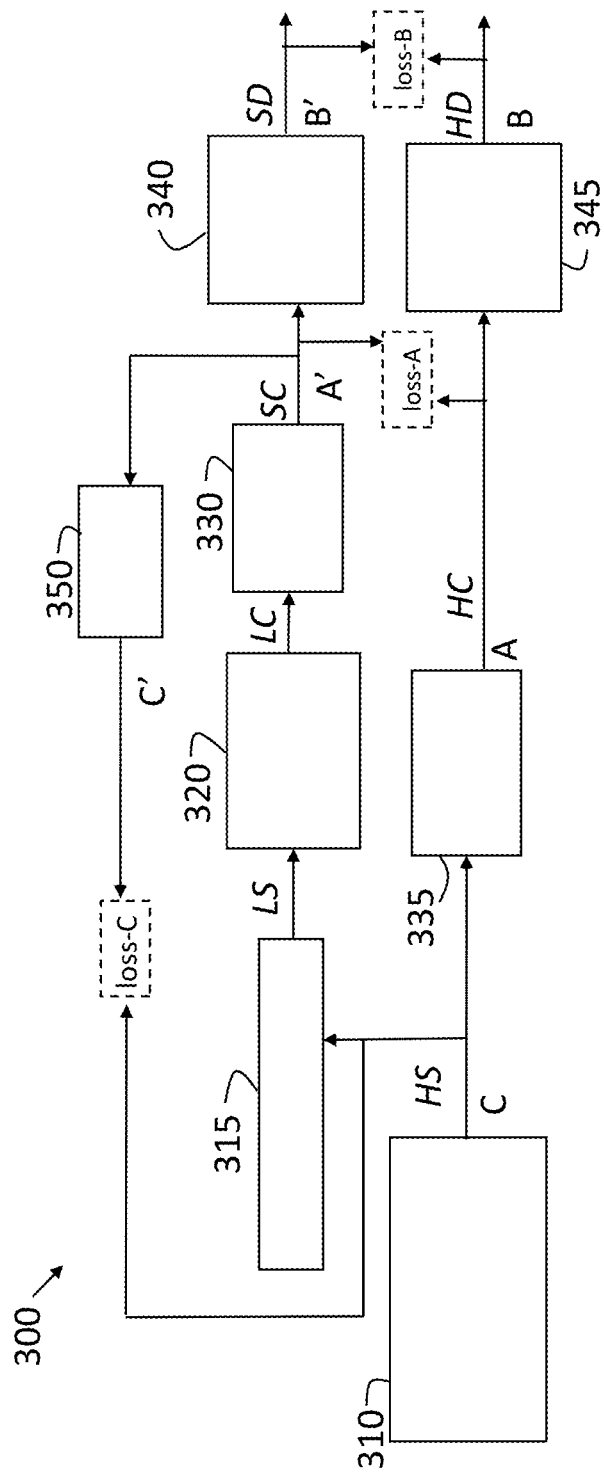
FIG. 3 shows the training process flow associated with deep learning for super resolution in the radar system according to an exemplary embodiment.

FIG. 3 shows the training process flow 300 associated with deep learning for super resolution in the radar system 110 according to an exemplary embodiment. The training process flow 300 provides a more detailed illustration than the general process flow 200 shown in FIG. 2. The training process flow 300 indicates multiple sources of loss, in multiple domains, that may be used to train the neural network. As previously noted, the processes shown in FIG. 3 may be performed by the radar controller 120, a vehicle controller 130, or a combination. At block 310, obtaining high-resolution radar output refers to obtaining high-resolution samples HS of reflected signals based on a high-resolution radar system. As previously noted, the high-resolution radar system has hardware and processing aspects that enable providing higher resolution data than the radar system 110. As one example, the high-resolution radar output obtained at block 310 may be based on more antenna elements 115 than those of the radar system 110 while maintaining the half-wavelength spacing. At block 315, reducing the resolution of the high-resolution samples HS (also indicated as C), obtained at block 310, may be accomplished in a number of ways, as detailed with reference to FIGS. 5-7. The result of the processing at block 315 is low-resolution samples LS. The generation of HS-LS pairs is a form of self-supervised learning.

At block 320, applying a matched filter to the low-resolution samples LS, obtained from the process at block 315, results in a low-resolution four-dimensional data cube LC. At block 335, applying a matched filter to the high-resolution samples HS, obtained at block 310, results in a high-resolution four-dimensional data cube HC (also indicated as A). The high-resolution samples HS and the low-resolution samples LS are in the time domain (i.e., time samples for each transmitted chirp). The existing matched filter processing involves a two-dimensional fast Fourier transform (FFT) and a beamforming process. Specifically, a range FFT provides a range-chirp map which indicates energy distribution across range values for each transmitted chirp for each receive channel and transmit channel. A Doppler FFT combines chirps for each range bin of the range-chirp map resulting from the range FFT. The resulting range-Doppler map indicates relative velocity and range of each detected object. A beamforming process performed on the range-Doppler map than provides azimuth and elevation angles to each detected object. Thus, in both the low-resolution four-dimensional data cube LC and the high-resolution four-dimensional data cube HC, the four dimensions are range, Doppler, azimuth, and elevation.

At block 330, processing of the low-resolution four-dimensional data cube LC by the neural network results in the super-resolution four-dimensional data cube SC (also indicated as A'). As FIG. 2 indicates, comparison (at block 250) of the output of the neural network (block 230) with ground truth (block 240) provides a loss, at block 260, that may be provided as feedback to improve the deep learning of the neural network. In the training process flow 300, there are three sets of comparisons and, thus, three sources of loss that may be combined or considered individually in the deep learning by the neural network (at block 330). The first comparison may be of A and A'. That is, the high-resolution four-dimensional data cube HC output by the matched filter at block 335 can be compared with the super-resolution four-dimensional data cube SC output by the neural network at block 330.

The difference, loss_A, may be provided to the neural network as feedback. This loss, loss_A, can be considered a data cube "image" loss due to the image-like structure of the data cube. Loss_A may be, for example, a combination of reconstruction loss (element-wise differences between HC and SC using L1/L2 norm), perceptual loss (difference between "deep" features of HC and SC generated by processing the data cubes with a pre-trained deep neural network such as the Visual Graphics Group (VGG) network), and adversarial loss (using Generative-Adversarial-network architecture, adding a discriminator network with the goal to determine whether the data cube was produced by the high resolution radar (i.e., is HC at block 335) or was produced by the neural network (i.e., is SC at block 330)).

The second comparison may be of B and B'. At block 345, performing detection on the high-resolution four-dimensional data cube HC output by the matched filter at block 335 results in detection information (i.e., high-resolution detection information HD, also indicated as B) that indicates range, Doppler, azimuth, and elevation to each detected object. Similarly, at block 340, performing detection on the super-resolution four-dimensional data cube SC output by the matched filter at block 330 results in detection information (i.e., super-resolution detection information SD also indicated as B') that indicates range, Doppler, azimuth, and elevation to each detected object. The difference resulting from comparing the high-resolution detection information HD (B) to the super-resolution detection information SD (B'), loss_B, may be provided to the neural network as feedback. This loss, loss_B, can be considered an output point cloud loss with the points being the radar detections (i.e. points in four dimensions (three dimensions and Doppler)). The comparison is of two point-clouds based on pairwise point distance, nearest neighbor point search, or density matching, for example. This loss directly measures the quality of the radar final output and may be used to ensure that the super-resolution process produces realistic and meaningful data.

The third comparison may be of C and C'. As indicated in FIG. 3, the super-resolution four-dimensional data cube SC output by the neural network at block 330 may be provided for inversion, at block 350. Inverting, at block 350, refers to converting the super-resolution four-dimensional data cube SC back to the time domain samples indicated at C'. As previously noted, the high-resolution samples HS are also indicated as C. The difference resulting from comparing the high-resolution samples HS (C) to the samples C' resulting from the inversion, at block 350, loss_C, may be provided to the neural network as feedback. This loss, loss_C, can be considered a time sample loss. According to an exemplary embodiment, all three losses, loss_A, loss_B, and loss_C, may be used together in the deep learning by the neural network. For example, a weighted loss, loss_w, can be computed as:

$$\text{loss\_}w = \alpha * \text{loss\_}A + \beta * \text{loss\_}B + \gamma * \text{loss\_}C \qquad [\text{EQ. 1}]$$

In EQ. 1, $\alpha$, $\beta$, and $\gamma$ are the weights respectively applied to loss_A, loss_B, and loss_C. The weights are optimized using a hyper-parameter search process.

Figure 4:
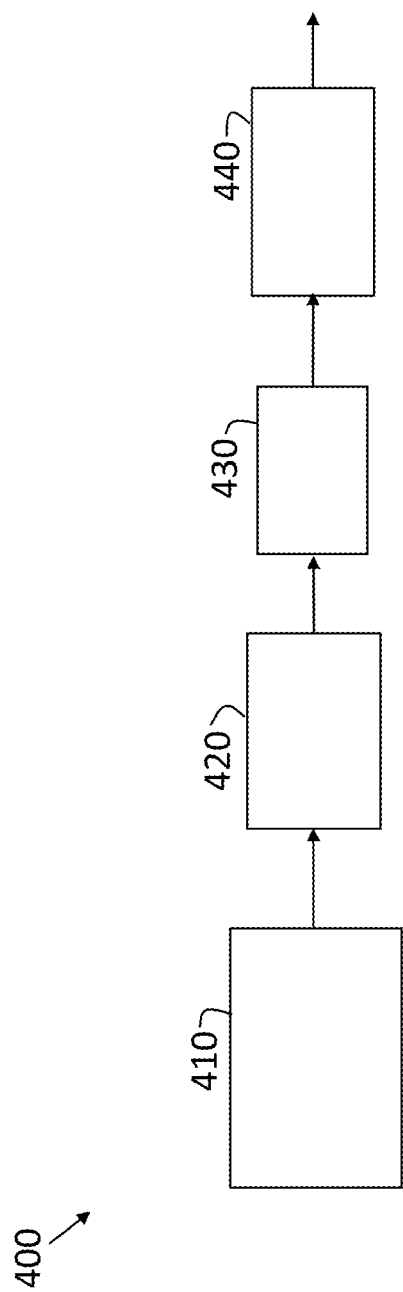
FIG. 4 shows the implementation flow associated with deep learning for super resolution in the radar system according to an exemplary embodiment.

FIG. 4 shows the implementation flow 400 associated with deep learning for super resolution in the radar system 110 according to an exemplary embodiment. The processes shown in FIG. 4 use the radar system 110, and the processing of reflections discussed with reference to FIG. 4 may be performed by the radar controller 120, the vehicle controller 130, or a combination. The neural network discussed with reference to block 330 (FIG. 3) and trained according to the process flow 300 discussed with reference to FIG. 3 is implemented (at block 430) to increase the resolution of information obtained with the radar system 110.

At block 410, obtaining low-resolution radar output refers to obtaining time samples using the radar system 110. This data is referred to as low-resolution radar output because the radar system 110 is a lower resolution system than the one used in the training of the neural network according to the process flow 300 (FIG. 3). At block 420, implementing a matched filter refers to obtaining a four-dimensional data cube from the time samples (obtained at block 410). At block 430, implementing the neural network results in obtaining a super-resolution four-dimensional data cube from the four-dimensional data cube output by the matched filter (at block 420). Using a detection algorithm, at block 440, is on the super-resolution four-dimensional data cube output by the neural network (at block 430), rather than the four-dimensional data cube output by the matched filter (at block 420). Thus, the azimuth, elevation, range, and Doppler values for any detected object are obtained at a higher resolution than would otherwise be possible with the radar system 110 based on using the neural network.

Figure 5:
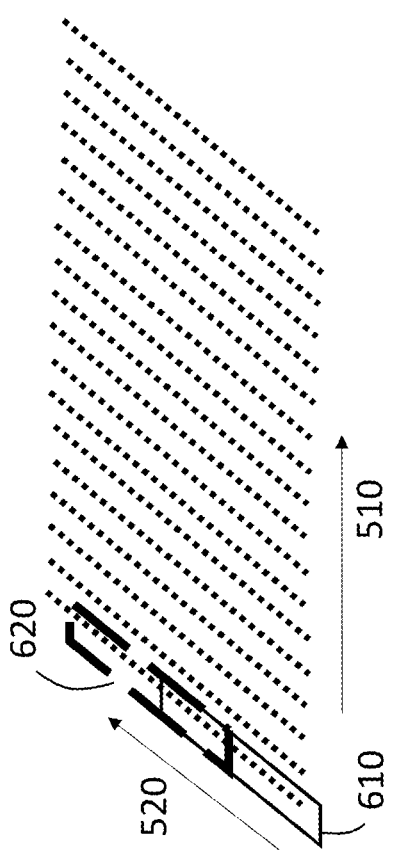
FIG. 5 illustrates reduction of Doppler resolution to achieve deep learning for super-resolution in a radar system according to one or more embodiments.
Figure 6:
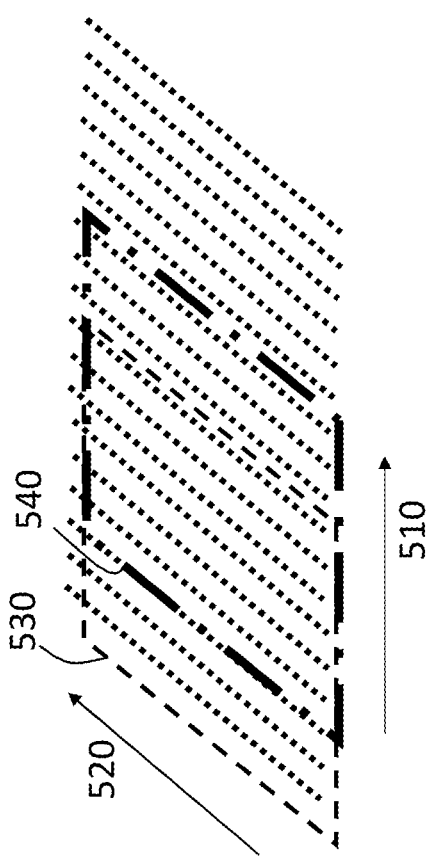
FIG. 6 illustrates reduction of range resolution to achieve deep learning for super-resolution in a radar system according to one or more embodiments.
Figure 7:
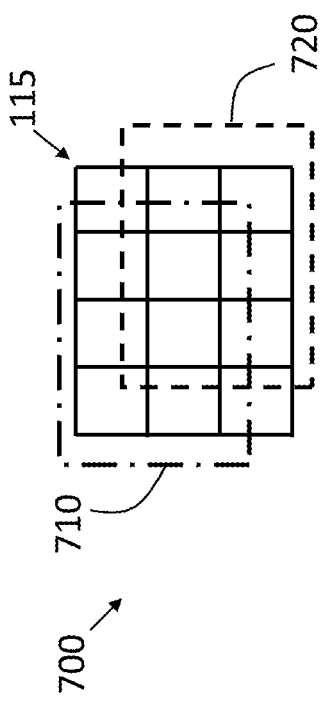
FIG. 7 illustrates reduction of angular resolution to achieve deep learning for super-resolution in a radar system according to one or more embodiments.

FIGS. 5-7 illustrate exemplary embodiments for the process of reducing resolution, at block 315 (FIG. 3). FIG. 5 illustrates reduction of Doppler resolution to achieve deep learning for super-resolution in the radar system 110 according to one or more embodiments. FIG. 5 shows chirps along axis 510 and time samples along axis 520. As the exemplary chirp sub-arrays 530, 540 indicate, reducing the resolution, at block 315 (FIG. 3) may include using all the time samples but from only a sub-set of the chirps (e.g., using only sub-array 530 or 540) to obtain the low-resolution samples LS.

FIG. 6 illustrates reduction of range resolution to achieve deep learning for super-resolution in the radar system 110 according to one or more embodiments. FIG. 6 shows chirps along axis 510 and time samples along axis 520. As the exemplary sample sub-arrays 610, 620 indicate, reducing the resolution, at block 315 (FIG. 3) may include using only a sub-set of the time samples (e.g., sub-array 610 or 620) from every chirp to obtain the low-resolution samples LS.

FIG. 7 illustrates reduction of angular resolution to achieve deep learning for super-resolution in the radar system 110 according to one or more embodiments. The full array of antenna elements 115 of the MIMO radar system used to obtain the high-resolution radar output, at block 310 (FIG. 3), is indicated as 700 in FIG. 7. FIG. 7 also indicates two exemplary MIMO sub-arrays 710, 720. Reducing the resolution, at block 315 (FIG. 3) may include using only a sub-set of the antenna elements 115 (e.g., only sub-array 710 or 720) to obtain the low-resolution samples LS. In determining exactly which sub-sets to use in reducing the resolution (at block 315), the actual radar system 110 may be considered. That is, for example, the actual number of antenna elements 115 of the radar system 110 may be used to select the size of the sub-set used to reduce the resolution at block 315 (FIG. 3). By training the neural network (at block 330, FIG. 3) using a reduced resolution that matches the resolution of the radar system 110, implementing the neural network (at block 430, FIG. 4) may provide better results than if the training does not consider the actual radar system 110. The training process discussed with reference to FIG. 3 may be performed iteratively. At different iterations, different sub-arrays may be selected (at block 315), using one of the processes discussed with reference to FIGS. 5-7, from the same radar frame (obtained at block 310).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of using deep learning for super resolution in a radar system, the method comprising:
obtaining first-resolution time samples from reflections based on transmissions by a first-resolution radar system of multiple frequency-modulated signals, wherein the first-resolution radar system includes multiple transmit elements and multiple receive elements;
reducing resolution of the first-resolution time samples to obtain second-resolution time samples;

implementing a matched filter on the first-resolution time samples to obtain a first-resolution data cube and on the second-resolution time samples to obtain a second-resolution data cube;

processing the second-resolution data cube with a neural network to obtain a third-resolution data cube;

training the neural network based on a first loss obtained by comparing the first-resolution data cube with the third-resolution data cube; and using the neural network with a second-resolution radar system to detect one or more objects.

2. The method according to claim 1, further comprising disposing the second-resolution radar system in a vehicle.

3. The method according to claim 1, further comprising performing detection of the one or more objects using the first-resolution data cube and using the third-resolution data cube.

4. The method according to claim 3, wherein the training the neural network is based on a second loss obtained by comparing a result of the detection performed using the first-resolution data cube with a result of the detection performed using the third-resolution data cube.

5. The method according to claim 1, further comprising inverting the third-resolution data cube to obtain third-resolution time samples.

6. The method according to claim 5, wherein the training the neural network is based on a third loss obtained by comparing the first-resolution time samples with the third-resolution time samples.

7. The method according to claim 1, wherein the reducing the resolution includes using all the first-resolution time samples resulting from only a sub-set of the multiple frequency-modulated signals.

8. The method according to claim 1, wherein the reducing the resolution includes using only a sub-set of the first-resolution time samples resulting from all the multiple frequency-modulated signals.

9. The method according to claim 1, wherein the reducing the resolution includes using the first-resolution time samples resulting from only a sub-set of the multiple transmit elements and the multiple receive elements of the first-resolution radar system.

10. The method according to claim 1, wherein the reducing the resolution includes obtaining the second-resolution time samples at a same resolution as time samples provided by the second-resolution radar system.

11. A system to use deep learning for super resolution in a radar system, the system comprising:

a first-resolution radar system configured to obtain first-resolution time samples from reflections based on transmissions of multiple frequency-modulated signals, wherein the first-resolution radar system includes multiple transmit elements and multiple receive elements;

a processor configured to reduce resolution of the first-resolution time samples to obtain second-resolution time samples, to implement a matched filter on the first-resolution time samples to obtain a first-resolution data cube and on the second-resolution time samples to obtain a second-resolution data cube, to process the second-resolution data cube with a neural network to obtain a third-resolution data cube, and to train the neural network based on a first loss obtained by comparing the first-resolution data cube with the third-resolution data cube; and a second-resolution radar system configured to use the neural network to detect one or more objects.

12. The system according to claim 11, wherein the second-resolution radar system is in a vehicle.

13. The system according to claim 11, wherein the processor is further configured to perform detection of the one or more objects using the first-resolution data cube and using the third-resolution data cube.

14. The system according to claim 13, wherein the processor is configured to train the neural network based on a second loss obtained by comparing a result of the detection performed using the first-resolution data cube with a result of the detection performed using the third-resolution data cube.

15. The system according to claim 11, wherein the processor is further configured to invert the third-resolution data cube to obtain third-resolution time samples.

16. The system according to claim 15, wherein the processor is configured to train the neural network based on a third loss obtained by comparing the first-resolution time samples with the third-resolution time samples.

17. The system according to claim 11, wherein the processor is configured to reduce the resolution of the first-resolution time samples by using all the first-resolution time samples resulting from only a sub-set of the multiple frequency-modulated signals.

18. The system according to claim 11, wherein the processor is configured to reduce the resolution of the first-resolution time samples by using only a sub-set of the first-resolution time samples resulting from all the multiple frequency-modulated signals.

19. The system according to claim 11, wherein the processor is configured to reduce the resolution of the first-resolution time samples by using the first-resolution time samples resulting from only a sub-set of the multiple transmit elements and the multiple receive elements of the first-resolution radar system.

20. The system according to claim 11, wherein the processor is configured to reduce the resolution to obtain the second-resolution time samples at a same resolution as time samples provided by the second-resolution radar system.

* * * * *